United States Patent [19]

Moore

[11] Patent Number: 4,930,834
[45] Date of Patent: Jun. 5, 1990

[54] FABRIC TAILGATE FOR A PICKUP TRUCK

[76] Inventor: Stephen J. Moore, 2076 E. Lamesa, Yuma, Ariz. 85364

[21] Appl. No.: 357,161

[22] Filed: May 26, 1989

[51] Int. Cl.$^5$ ............................................. D62D 25/00
[52] U.S. Cl. ..................................... 296/50; 296/180.1
[58] Field of Search ............... 296/50, 180.1, 180.2, 296/85, 57.1, 96.11, 100, 37.1, 161, 24.1, 27; 160/392, 394, 354, 370.1

[56] References Cited

U.S. PATENT DOCUMENTS

| | | | |
|---|---|---|---|
| 1,187,402 | 6/1916 | Traut | 160/392 |
| 1,246,544 | 11/1917 | Chassaing | 160/392 |
| 1,487,151 | 3/1924 | Dixon | 296/96.11 |
| 3,957,068 | 5/1976 | Cox | 296/27 |
| 4,763,944 | 8/1988 | Fry et al. | 296/50 |
| 4,778,213 | 10/1988 | Palmer | 296/57.1 |

FOREIGN PATENT DOCUMENTS 0235477  6/1925  Fed. Rep. of Germany ........ 296/85

Primary Examiner—Robert R. Song

[57] ABSTRACT

A fabric tailgate for a pickup truck which has a cargo carrier with a bed, vertical sides and a front enclosing the bed with an open end, is made by forming a rectangular sheet of material made from plastic fabric having re-enforced edges and a length as long as the pickup truck opening is wide and a height as high as the vertical sides of the pickup. Along the top and outer edges of the fabric tailgate are straps which pass through "U" shaped mounting brackets attached to the upper edge of the open end of the pickup truck. A "C" shaped securing mounting is attached along the bottom edge of the pickup truck. A cylindrical plastic rod is sewn into the hem along the bottom of the fabric tailgate and inserted into the "C" shaped opening of the mounting bracket. The "C" shaped mounting bracket extends along the entire length of the bed of the pickup truck. Once the fabric tailgate is anchored along the bottom to the "C" shaped anchoring bracket, the top portions are pulled tight with the straps and the fabric tailgate is installed.

The weave of the tailgate should be fine enough so that it permits free entry of wind and also permits the insertion of painted material on the outer portion of the fabric which can be read by a viewer approaching the rear of the pickup truck.

6 Claims, 1 Drawing Sheet

FABRIC TAILGATE FOR A PICKUP TRUCK

BRIEF DESCRIPTION OF THE PRIOR ART

Fabric tailgates are often supplied in place of the metal tailgates normally installed on a pickup truck. The fabric tailgates extend across the open portion of the cargo carrying portion of the pickup truck in substitution for the normal metal tailgate.

The prior art devices, however, such as one constructed by "PRO NET" (which is trademarked) provide an open weave having approximately two by three inches at least between the vertical and horizontal bars of the weave. A solid space must be provided inside or along the fabric tailgate to provide for logo or other nomenclature desired by the buyer. The tailgate further suffers from material being able to pass through the weave and along the bed of the pickup truck when the pickup truck accelerates and pass under the fabric tailgate and can be lost or damaged, since there is no means for adequately anchoring the fabric tailgate.

BRIEF DESCRIPTION OF THE INVENTION

This invention provides several unique features heretofore not found in prior art fabric tailgate enclosures.

First, the mesh is made of an extremely fine polyvinyl chloride coated material which is woven close enough so that logo or other names may be imprinted upon the material without requiring a solid surface for the printed material to be affixed thereto.

Secondly, the fabric tailgate has an unique attachment between the bottom edge of the fabric of the tailgate and the rear edge of the pickup truck bed. The attachment essentially comprises a "C" shaped attachment means which extends substantially the width of the open end of the tailgate bed and is screwed or attached by other means to the edge of the bed. The fabric material has a tubular or cylindrical rod sewn in and along the bottom edge of the fabric tailgate. The rod and the fabric are then inserted into the "C" shaped slot of the attachment means so that the bottom edge is firmly secured along the bottom edge of the pickup, thus, preventing material from moving along the bed and under the tailgate.

DETAILED DESCRIPTION OF THE FIGURES

Figure 1:
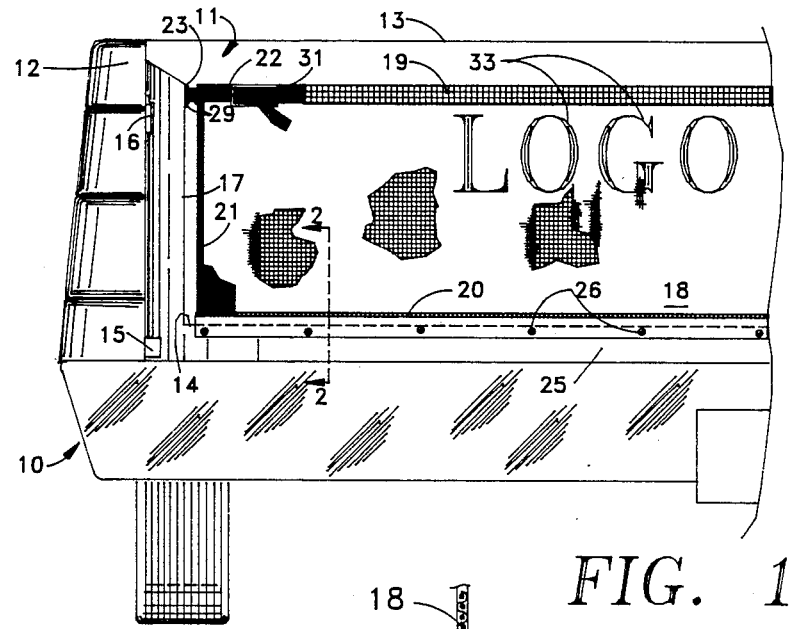
FIG. 1 is a partial end view of a pickup truck illustrating the mounting of the fabric tailgate to the pickup truck.

Referring to all of the FIGURES, but in particular to FIG. 1, a pickup truck generally referred to by arrow 10 is illustrated which has a cargo carrying portion referred to by arrow 11 which has a left side 12, front end 13 and a right side not illustrated. Cargo carrying portion 11 also includes a bed 14 which is rigidly attached in most cases to sides 12, 13 and the remaining side 12 which is not illustrated. Normally pickup truck 10 has a pivotal hinge 15 and a tailgate folding support anchor 16 utilized for the purpose of mounting a metal tailgate across the exposed rear opening. Side 12 normally contains an inside portion 17.

A fabric tailgate 18, which is the subject matter of this invention, has a top hemmed edge 19, a bottom edge 20, a left hemmed edge 21 and a right hemmed edge which is not illustrated. Top hemmed edge 19 has a strap 22 which passes through an "U" shaped bracket 23 which is attached by screws or other means 29 to inside wall portion 17 of side 12. An identical "U" shaped bracket 23 is attached to the right-hand side of pickup truck 10 which is not illustrated. A "C" shaped anchor 25 is attached along edge of bed 14 of pickup truck 10 by any usual means such as screws 26. Anchor 25 has an upper "C" shaped portion 27 which has an inner diameter 28 of a size sufficient to receive fabric tailgate 18 and an intertubular member 29. Intertubular member 24 extends the entire length of fabric tailgate 18 and is sewed by means of threads 30 along bottom hem 20 of fabric tailgate 18.

OPERATION

Fabric tailgate 18 is assembled by inserting fabric covered tubular member 24 inside 28 of "C" shaped anchor 25 along the full length of "C" shaped anchor 25. Once the above is accomplished, then "C" shaped anchor 25 is laid along bed 14, as shown in FIG. 1, and screws 26 are then passed through anchor 25 and into bed 14. "C" shaped anchor 25 will then be securely attached along the entire length of bed 14 across the opening of pickup truck 10. Fabric tailgate 18 is then raised until it is tight. "U" shaped brackets 23 are then attached normally a quarter inch higher than top edge 19 of tailgate 18 by drilling and attaching screws 29 into inside portion 17 of side 12. The remaining side, not shown, is likewise attached. Straps 22 are then passed through "U" shaped anchor 23 and through a buckle 31 and pulled tight on both sides of pickup truck 10. Fabric tailgate 18 is then properly installed.

Figure 2:
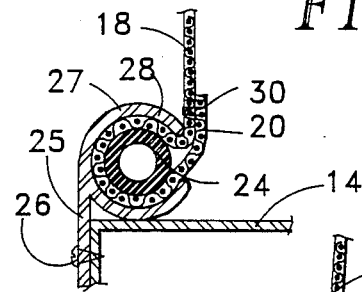
FIG. 2 is a cross-sectional view taken through lines 2—2 of FIG. 1 of a portion of the tailgate; and, FIG. 3 is an alternate mounting method for the attachment means illustrated in FIG. 2.
Figure 3:
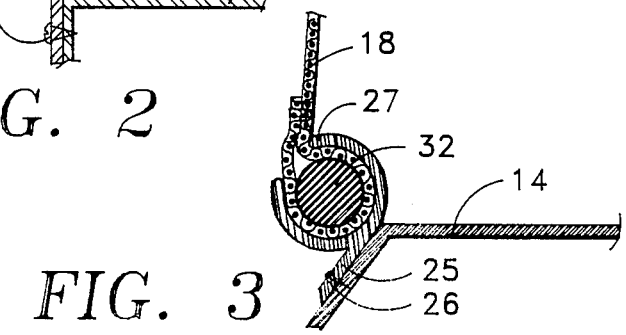

An alternate method of attaching "C" shaped anchor 25 is illustrated in FIG. 3 wherein anchor 25 is attached in the reverse direction to that illustrated in FIG. 2. The fabric will be screwed in the exactly same way as that illustrated in FIG. 2. Rather than a tube as shown in FIG. 2, a solid plastic or metal rod 32 can be substituted. It is obvious that tube 24 or rod 32 can be either plastic or metal at the selection of the installer.

MESH SIZE

The prior art has been constructed using extremely large mesh, at least two by three inch holes through fabric tailgate 18. There is no possibility for fabric tailgate 18 to provide advertising or other information desired by the seller or owner without having a portion of the net solid. In order to provide a ready means for advertising or adding other information satisfactory to the seller or owner, a mesh size has been developed which is unique, in that it has a sufficiently low wind resistance for providing the advantages of a fabric tailgate (increase gas mileage due to a drop of wind resistance against the tailgate) and yet provide for a means for adding a logo 33 as illustrated in FIG. 1 to fabric tailgate 18.

One fabric that meets the requirements for the tailgate as described in this invention has a thread count of seventeen by twelve; has a weight of thirteen to fourteen ounces per square yard, and is made of polyvinyl chloride coated polyester yarn.

CONCLUSIONS

An unique fabric tailgate has been disclosed which provides means for inserting a large logo on the fabric tailgate; provides a very low wind resistance so that the advantages of the fabric tailgate are realized and provides for a secure cargo carrying ability by not only a fine mesh, but also an unique anchor between the bed of the pickup truck and the fabric tailgate.

It is obvious of course that other modifications can be made and still be well within the spirit and scope of this invention as described in the specification and appended claims.

What I claim is:

1. A fabric tailgate for a pickup truck having a cargo carrier with a bed, sides and a front enclosing said bed and an open end; said fabric tailgate comprising:
    (a) a plastic fabric having ends, a top and a bottom; and wherein said plastic fabric is plastic coated polyester yarn having a weave of at least twenty threads per inch, but not less than ten threads per inch, vertically and horizontally so that a logo could be printed thereon and can be read by a person viewing said logo;
    (b) C-shaped anchoring means mounted on said open end to each of said sides and at the top of said sides;
    (c) strap means attached to said plastic fabric along said top and adapted to extend through said anchoring means;
    (d) strap securing means attached to said strap means and configured to receive said strap means and lock said strap means to said fabric means and to said sides of said truck so that said fabric means is stretched across said open end;
    (e) an elongate securing means of a C-shaped cross-section and a length substantially same as the width of the truck bed.
    (f) mounting means attached to said elongate securing means for attaching said securing means to the open edge of said bed;
    (g) cylindrical means secured along the bottom of said plastic fabric, the diameter of said cylindrical means and the thickness of said plastic fabric when combined being dimensioned to slide into said elongate anchoring means to lock said plastic fabric along the open edge of said bed;
    whereby said plastic fabric is retained along the bottom by said said elongate securing means and at the top to the sides by said "C" shaped anchoring means and said straps.

2. Apparatus a claimed in claim 1 wherein said plastic fabric is plastic coated polyester yarn having a weave of seventeen vertical threads per inch and thirteen horizontal threads per inch.

3. Apparatus as claimed in claim 1 wherein said cylindrical means is a plastic tube.

4. Apparatus as claimed in claim 1 wherein said cylindrical means is a rod.

5. Apparatus as claimed in claim 1 wherein said plastic fabric is polyvinyl chloride coated polyester yarn.

6. Apparatus as claimed in claim 2 wherein said plastic fabric is polyvinyl chloride coated polyester yarn.

* * * * *